United States Patent
Lee

(10) Patent No.: US 9,694,797 B2
(45) Date of Patent: Jul. 4, 2017

(54) PEDAL SIMULATOR

(71) Applicant: MANDO CORPORATION, Pyeongtaek-si (KR)

(72) Inventor: Chan-Hui Lee, Seongnam-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/749,479

(22) Filed: Jun. 24, 2015

(65) Prior Publication Data

US 2015/0375721 A1 Dec. 31, 2015

(30) Foreign Application Priority Data

Jun. 26, 2014 (KR) .......................... 10-2014-0078658

(51) Int. Cl.
*B60T 8/40* (2006.01)
*B60T 7/04* (2006.01)

(52) U.S. Cl.
CPC ............ *B60T 8/409* (2013.01); *B60T 8/4086* (2013.01); *B60T 7/042* (2013.01); *B60T 8/4081* (2013.01)

(58) Field of Classification Search
CPC ........ B60T 8/4081; B60T 7/042; B60T 8/409; B60T 8/4086
USPC ....................................... 303/113.4, 14, 9.62
See application file for complete search history.

(56) References Cited

U.S. PATENT DOCUMENTS

| | | | |
|---|---|---|---|
| 2012/0193975 A1* | 8/2012 | Ishii ...................... | B60T 8/4081 303/14 |
| 2012/0306260 A1* | 12/2012 | Ohkubo .................. | B60T 7/042 303/14 |
| 2014/0008965 A1* | 1/2014 | Ito .......................... | B60T 8/4081 303/3 |
| 2014/0028084 A1* | 1/2014 | Biller .................... | B60T 8/4081 303/9.62 |
| 2014/0117747 A1* | 5/2014 | Yang ...................... | B60T 7/042 303/6.01 |

* cited by examiner

*Primary Examiner* — Melanie Torres Williams
(74) *Attorney, Agent, or Firm* — Ladas & Parry, LLP

(57) ABSTRACT

Disclosed herein is a pedal simulator. The pedal simulator installed at an electronic brake system which includes a master cylinder coupled with a reserver and configured to generate an oil pressure according to a driver's pedal force, a pedal displacement sensor configured to detect displacement of a brake pedal, and an oil pressure generating device configured to output an electric signal corresponding to an operation of the brake pedal through the pedal displacement sensor, to operate a motor and also to convert a rotating force of the motor into a rectilinear motion, includes a pedal simulation unit connected with the master cylinder and configured to provide a reaction force according to the pedal force of the brake pedal; and a simulation valve connected with a rear end of the pedal simulation unit and configured to control a flow in a passage according to an opening and closing operation, wherein the simulation valve controls a flow rate of the oil by controlling a degree of opening and closing.

20 Claims, 4 Drawing Sheets

PEDAL SIMULATOR

CROSS-REFERENCE TO RELATED APPLICATION

This application claims the benefit of Korean Patent Application No. 10-2014-0078658, filed on Jun. 26, 2014 in the Korean Intellectual Property Office, the disclosure of which is incorporated in its entirety herein by reference.

BACKGROUND

1. Field

Embodiments of the present invention relate to an electronic brake system, and more particularly, to a pedal simulator which is capable of providing an appropriate pedal feeling required by a driver by controlling a degree of opening and closing of a valve.

2. Description of the Related Art

In general, a brake system is essentially installed at a vehicle. Recently, a new brake system in which a braking oil pressure transmitted to a wheel cylinder installed at a wheel is electronically controlled to obtain a stronger and more stable braking force has been proposed. As an example of the electronic brake system, there is an anti-lock brake system (ABS), a brake traction control system (BTCS), an electronic stability control system (ESC), or the like.

An electronic brake system is a brake system in which, when a driver presses down a pedal, an electronic control unit (ECU) detects this situation, an oil pressure generating device is operated to generate an oil pressure, and thus a braking operation is performed. That is, when the driver presses down the pedal, a pedal displacement sensor detects displacement of the brake pedal, and the oil pressure generating device is operated, and thus the braking operation is performed.

However, in the electronic brake system as described above, there are difficulties in that a separate hydraulic pedal simulator should be installed to provide a pedal feeling to the driver while braking, and a reaction force similar to that of the pedal simulator of a conventional brake system (CBS) should be provided.

SUMMARY

Therefore, it is an aspect of the present invention to provide a pedal simulator which is capable of providing a pedal feeling by generating a pressure similar to that of a pedal force in a pedal simulation unit.

Also, it is another aspect of the present invention to provide a pedal simulator which is capable of providing various pedal feelings by controlling an oil pressure level generated by transmitting an oil pressure to an inside of the pedal simulation unit, and a degree of opening and closing of a simulation valve.

Additional aspects of the invention will be set forth in part in the description which follows and, in part, will be obvious from the description, or may be learned by practice of the invention.

In accordance with one aspect of the present invention, a pedal simulator installed at an electronic brake system which includes a master cylinder coupled with a reservoir and configured to generate an oil pressure according to a driver's pedal force, a pedal displacement sensor configured to detect displacement of a brake pedal, and an oil pressure generating device configured to output an electric signal corresponding to an operation of the brake pedal through the pedal displacement sensor, to operate a motor and also to convert a rotating force of the motor into a rectilinear motion, includes a pedal simulation unit connected with the master cylinder and configured to provide a reaction force according to the pedal force of the brake pedal; and a simulation valve connected with a rear end of the pedal simulation unit and configured to control a flow in a passage according to an opening and closing operation, wherein the simulation valve controls a flow rate of the oil by controlling a degree of opening and closing is controlled.

The oil pressure generating device may receive displacement of the brake pedal through the pedal displacement sensor, and may supply a pressure corresponding to the displacement to the pedal simulation unit.

The simulation valve may control the degree of opening and closing according to a back pressure transmitted to the pedal simulation unit through the oil pressure generating device.

The oil pressure generating device may be connected with the reserver through an inlet passage to receive oil, and an outlet side of the oil pressure generating device may be connected with the pedal simulation unit, and the simulation valve connected with the pedal simulation unit may be connected with the reserver through the inlet passage.

The pedal simulation unit may include a simulation chamber configured to store the oil discharged from an outlet side of the master cylinder; a reaction force piston slidably provided in the simulation chamber; and a reaction force spring provided in the simulation chamber to provide an elastic force to the reaction force piston.

The simulation valve may be a normally closed type solenoid valve which is operated to be closed in a normal state and opened when an opening signal is received.

The oil pressure generating device may be connected with the pedal simulation unit through a liquid pressure passage, and the liquid pressure passage may be formed to be branched from a passage connected with an outlet side of the oil pressure generating device.

The pedal simulator may further include a control valve provided at the liquid pressure passage to control the flow in the passage according to an opening and closing operation.

The control valve may be a normally closed type solenoid valve which is operated to be closed in a normal state and opened when an opening signal is received.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF MAIN ELEMENTS

| | |
|---|---|
| 10: brake pedal | 11: pedal displacement sensor |
| 12: input rod | 20: master cylinder |
| 30: reserver | 40: wheel cylinder |
| 110: oil pressure generating device | 111: pressure chamber |
| 112: pressure piston | 113: pressure spring |
| 114: motor | 115: ball screw member |
| 116: inlet passage | 117: check valve |
| 120: oil pressure control unit | 121: first circuit |
| 122: second circuit | 126: return passage |
| 131: first inlet passage | 132: second inlet passage |
| 133: first switching valve | 134: second switching valve |
| 135: first check valve | 136: second check valve |
| 141: first backup passage | 142: second backup passage |
| 143: first blocking valve | 144: second blocking valve |
| 150: pedal simulator | 155: simulation valve |
| 160: compliance unit | 165: compliance valve |

DETAILED DESCRIPTION

Hereinafter, exemplary embodiments of the present invention will be described in detail with reference to the accompanying drawings.

Figure 1:
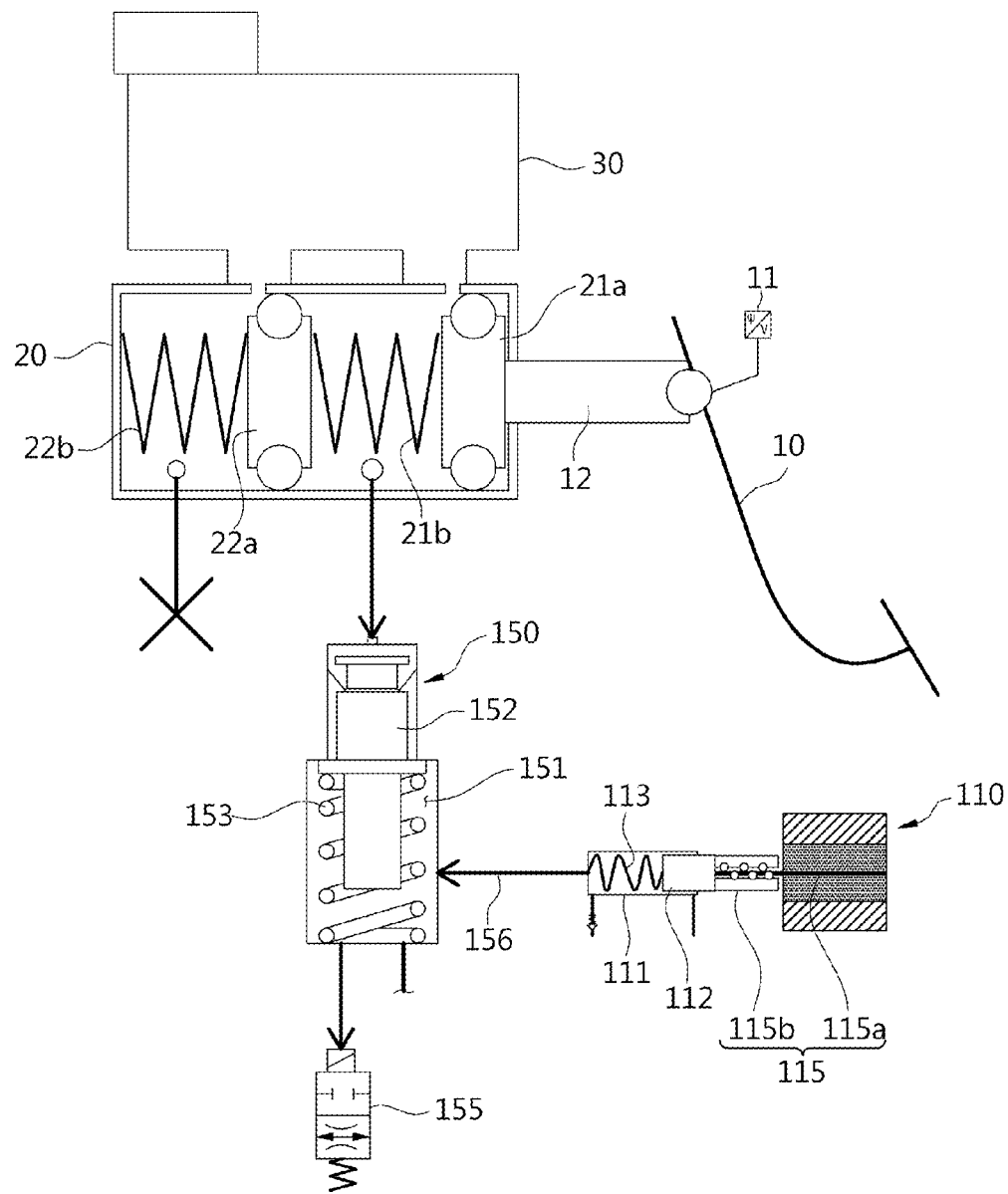
FIG. 1 is a view schematically illustrating a connection structure of a pedal simulator according to one embodiment of the present invention.
Figure 2:
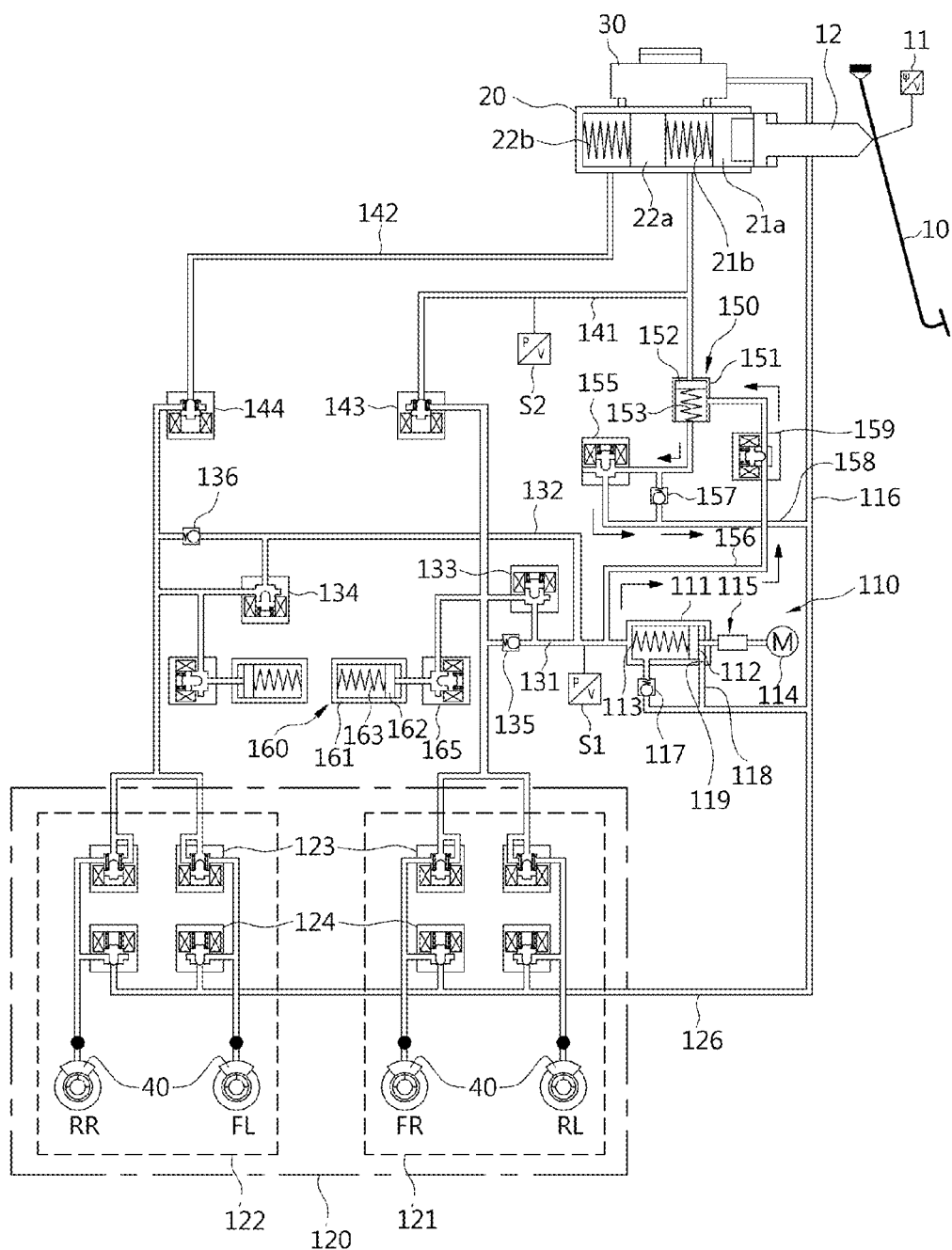
FIG. 2 is a hydraulic circuit diagram schematically illustrating an electronic brake system with the pedal simulator according to one embodiment of the present invention.

FIG. 1 is a view schematically illustrating a connection structure of a pedal simulator according to one embodiment of the present invention, and FIG. 2 is a hydraulic circuit diagram schematically illustrating an electronic brake system with the pedal simulator according to one embodiment of the present invention.

Referring to FIGS. 1 and 2, the pedal simulator 150 according to one embodiment of the present invention is configured to transmit an oil pressure generated from an oil pressure generating device 110 to a pedal simulation unit and to control a pedal feeling by controlling a degree of opening and closing of a simulation valve 155 connected with the pedal simulation unit. That is, the pedal simulator 150 serves to generate a pressure similar to that of a pedal force using the oil pressure generating device 110 of an electronic brake system to provide a reaction force, and to realize the appropriate pedal feeling by controlling the degree of opening and closing of the simulation valve 155. Before the pedal simulator 150, the electronic brake system will be described.

Generally, the electronic brake system includes a master cylinder 20 which generates a liquid pressure, a reserver 30 which is coupled to an upper portion of the master cylinder 20 to store oil, an input rod 12 which presses the master cylinder 20 according to a pedal force of a brake pedal 10, a pedal displacement sensor 11 which detects displacement of the brake pedal 10, and a wheel cylinder 40 which receives the liquid pressure and controls each wheel RR, RL, FR, FL.

The master cylinder 20 includes at least one liquid pressure chamber to generate the liquid pressure. However, as illustrated in the drawings, a first piston 21a and a second piston 22a are formed to have two hydraulic circuits, and are in contact with the input rod 12. The master cylinder 20 has the two hydraulic circuits in order to ensure safety when one of the hydraulic circuits breaks down. For example, one of the two hydraulic circuits is connected with a right front wheel FR and a left rear wheel RL, and the other is connected with a left front wheel FL and a right rear wheel RR. Alternatively, one of the two hydraulic circuits is connected with the two front wheels FR and FL, and the other is connected with the two rear wheels RR and RL. The two hydraulic circuits are independently provided in order to enable a vehicle to be braked even when one of the hydraulic circuits breaks down.

A first spring 21b and a second spring 22b are provided at the first and second pistons 21a and 22a of the master cylinder 20, respectively. While the first and second pistons 21a and 22a are compressed, each of the first and second springs 21b and 22b stores an elastic force. When a force pushing on the first piston 21a is smaller than the elastic force, the elastic force pushes the first and second pistons 21a and 22a back to their original states.

Meanwhile, as the input rod 12 which presses the first piston 21a of the master cylinder 20 is in close contact with the first piston 21a, a gap between the master cylinder 20 and the input rod 12 does not exist. That is, when the brake pedal 10 is pressed down, the master cylinder 20 is directly pressed without an invalid pedal stroke section.

Also, the electronic brake system includes the oil pressure generating device 110 which is operated according to an electric signal corresponding to a driver's braking intention received from the pedal displacement sensor 11 detecting the displacement of the brake pedal 10, an oil pressure control unit 120 which brakes the wheels with a force generated by the oil pressure generating device 110, switching valves 133 and 134 which are installed at a passage connecting the oil pressure generating device 110 with the oil pressure control unit 120 so as to control the liquid pressure, blocking valves 143 and 144 which control the liquid pressure transmitted from the master cylinder 20 to the wheel cylinder 40, a compliance unit 160 which is installed at a passage, to which the switching valves 133 and 134 and the blocking valves 143 and 144 are connected, so that a volume thereof is changed according to a pressure change, and the pedal simulator 150 which is connected with the master cylinder 20 to provide a reaction force to the brake pedal 10.

The oil pressure generating device 110 includes a pressure chamber 111 in which a predetermined space for receiving and storing the oil from the reserver 30 is formed, a hydraulic piston 112 and a hydraulic spring 113 which are provided in the pressure chamber 111, a motor 114 which generates a rotating force according to an electric signal of the pedal displacement sensor 11, a ball screw member 115 which is configured with a screw 115a and a ball nut 115b to convert a rotational motion of the motor 114 into a rectilinear motion, and an inlet passage 116 which connects the reserver 30 with the pressure chamber 111 to supply the oil to the pressure chamber 111. Here, a signal detected by the pedal displacement sensor 11 is transferred to an electronic control unit (ECU) (not shown), and the ECU controls valves provided at the motor 114 and the electronic brake system. An operation of a plurality of valves which are controlled according to the displacement of the brake pedal 10 will be described below.

As described above, the pressure chamber 111 is connected with the reserver 30 through the inlet passage 116 to receive and store the oil. In the pressure chamber 111, the hydraulic piston 112 and the hydraulic spring 113 which elastically supports the hydraulic piston 112 are provided. The hydraulic piston 112 is connected with the ball nut 115b of the ball screw member 115 to press the pressure chamber 111 by a rectilinear motion of the ball nut 115b, and the hydraulic spring 113 serves to return the hydraulic piston 112 to its original position, when the ball nut 115b is returned to its original position.

The oil pressure generating device 110 is connected with the pedal simulator 150 through a liquid pressure passage 156, and serves to supply a pressure to a simulation chamber 151 of the pedal simulation unit which will be described later. That is, the liquid pressure passage 156 is formed to be branched from a first inlet passage 131 which will be described later and is connected with an outlet side of the oil pressure generating device 110, and connected with the pedal simulation unit. Therefore, the oil pressure generating device 110 detects the displacement of the brake pedal 10 through the pedal displacement sensor 11, and transmits a pressure corresponding to the pedal displacement to the simulation chamber 151. This serves to supply the pressure to the pedal simulation unit and thus to provide the reaction force to the brake pedal 10, which will be described again below.

The motor 114 is an electric motor which generates the rotating force through a signal output from the ECU, and the rotating force is generated in a normal or reverse direction through the ECU. At this time, the screw 115a of the ball screw member 115 which converts the rotating force into the rectilinear motion serves as a rotating shaft of the motor 114 and also serves to rectilinearly move the ball nut 115b. A structure of the ball screw member 115 may be realized by a well-known technique which is typically used, and thus the description thereof will be omitted.

Meanwhile, a check valve 117 is installed at the inlet passage 116 to prevent a pressure of the pressure chamber 111 from flowing back. The check valve 117 serves to prevent the pressure of the pressure chamber 111 from flowing back, and also to suck and store the oil in the pressure chamber 111 when the hydraulic piston 112 is returned.

Also, the oil pressure generating device 110 may be configured to prevent a state in which the pressure in the pressure chamber 111 is not released to an atmospheric pressure, while the hydraulic piston 112 is returned and the oil in the pressure chamber 111 is sucked. For example, a cut-off hole 119 is formed at the pressure chamber 111, and a connection passage 118 which connects the cut-off hole 119 with the inlet passage 116 is formed between the pressure chamber 111 and the inlet passage 116. At this time, the cut-off hole 119 is formed at a position corresponding to an initial position of the hydraulic piston 112. Therefore, when the hydraulic piston 112 is returned, the pressure chamber 111 is automatically connected with the reservoir 30, and thus the pressure is returned to the atmospheric pressure.

Meanwhile, a reference numeral S1 which is not described is a first pressure sensor which detects the liquid pressure of the pressure chamber 111.

The oil pressure control unit 120 has two wheel control circuits including a first circuit 121 for controlling at least one first wheel and a second circuit 122 for controlling at least one second wheel, which receive the liquid pressure to perform a braking operation. At this time, the first wheel may include the right front wheel FR and the left rear wheel RL, and the second wheel may include left front wheel FL and the right rear wheel RR. The wheel cylinder 40 is installed at each wheel FR, FL, RR, RL to receive the liquid pressure and to perform the braking operation. That is, each circuit 121, 122 includes a passage which is connected with the wheel cylinder 40, and a plurality of valves 123 and 124 which control the liquid pressure are installed at the passage.

According to the drawings, the plurality of valves 123 and 124 include an in-valve 123 which is disposed at an upstream side of the wheel cylinder 40 to control the liquid pressure transmitted to the wheel cylinder 40 and configured with a normally open type solenoid valve, and an out-valve 124 which is disposed at a downstream side of the wheel cylinder 40 to control the liquid pressure escaping from the wheel cylinder 40 and configured with a normally closed type solenoid valve. An opening and closing operation of each of the solenoid valves 123 and 124 is controlled through the ECU.

Also, the oil pressure control unit 120 includes a return passage 126 which connects the out-valve 124 with the inlet passage 116. The return passage 126 is formed to discharge the liquid pressure transmitted to the wheel cylinder 40 and to transmit the liquid pressure to the reservoir 30 or the oil pressure generating device 110.

The oil pressure generating device 110 is connected with each circuit 121, 122 of the oil pressure control unit 120 through the first inlet passage 131 and a second inlet passage 132. At this time, the first switching valve 133 which controls the liquid pressure transmitted to the wheel cylinder 40 of the first circuit 121 by an opening and closing operation is installed at the first inlet passage 131, and the second switching valve 134 which controls the liquid pressure transmitted to the wheel cylinder 40 of the second circuit 122 by an opening and closing operation is installed at the second inlet passage 132. The second inlet passage 132 is formed to be branched from the first inlet passage 131 and connected with the second circuit 122. The opening and closing operation of each of the first and second switching valves 133 and 134 is controlled through the ECU so that the liquid pressure generated from the oil pressure generating device 110 is directly transmitted to the wheel cylinder 40. That is, the first switching valve 133 serves to control the liquid pressure supplied to the first circuit 121, and the second switching valve 134 serves to control the liquid pressure supplied to the second circuit 122.

Each of the first and second switching valves 133 and 134 is configured with the normally closed type solenoid valve which is operated to be closed in a normal state and opened when an opening signal is received from the ECU. At this time, although not shown in the drawings, the first switching valve 133 may be the normally open type solenoid valve which is operated to be opened in the normal state and closed when a closing signal is received from the ECU. That is, when the first switching valve 133 is configured with the normally open type solenoid valve, the first switching valve 133 may be opened without power, and thus may be easily operated.

Meanwhile, check valves 135 and 136 are respectively installed in parallel at the first and second switching valves 133 and 134 disposed at connection portions between the pressure chamber 111 and each circuit 121, 122. The check valves 135 and 136 includes a first check valve 135 disposed in parallel with the first switching valve 133, and a second check valve 136 disposed in parallel with the second switching valve 134. The check valves 135 and 136 are one-way valves provided to transmit the liquid pressure to only the wheel cylinder 40, and serve to prevent a pressure rise due to a delay action of the first and second switching valves 133 and 134.

In addition, to perform the braking operation according to the pedal force of the brake pedal 10, even when the electronic brake system breaks down, first and second backup passages 141 and 142 forming passages may be provided between the wheel cylinder 40 and the master cylinder 20 having the two hydraulic circuits. The first blocking valve 143 which opens and closes the first backup passage 141 is provided at a middle portion of the first backup passage 141, and the second blocking valve 144 which opens and closes the second backup passage 142 is provided at a middle portion of the second backup passage 142. The first backup passage 141 is connected with the first circuit 121 through the first blocking valve 143, and the second backup passage 142 is connected with the second circuit 122 through the second blocking valve 144. In particular, a second pressure sensor S2 which measures an oil pressure of the master cylinder 20 may be provided between the first blocking valve 143 and the master cylinder 20. Therefore, when the driver performs the braking operation, the first and second backup passages 141 and 142 are blocked by the first and second blocking valves 143 and 144, and the driver's braking intention may be determined by the second pressure sensor S2.

Each of the first and second blocking valves 143 and 144 is configured with the normally open type solenoid valve which is operated to be opened in the normal state and closed when the closing signal is received from the ECU.

The compliance unit 160 is installed at the passages through which the switching valves 133 and 134 are connected with the blocking valves 143 and 144. According to the drawings, the compliance unit 160 is installed between the first switching valve 133 and the first blocking valve 143 and between the second switching valve 134 and the second blocking valve 144. At this time, each compliance unit 160 is provided to store the liquid pressure generated from the oil pressure generating device 110, and has the same structure and function. That is, the two compliance units 160 serve to independently supply the charged liquid pressure to the first circuit 121 and the second circuit 122, respectively.

Each of the compliance unit 160 includes a compliance chamber 161 which has a predetermined volume to store the liquid pressure, and a compliance valve 165 which is provided at an inlet side of the compliance chamber 161. A piston 162 and an elastic member 163 are provided in the compliance chamber 161 so that the volume is varied within a predetermined range according to the liquid pressure introduced into the compliance chamber 161. The compliance valve 165 is configured with the normally closed type solenoid valve which is closed in the normal state and then opened when the opening signal is received from the ECU.

For example, in the case in which an ABS cycle is continued for a long period of time, while the braking operation is performed, a braking pressure may not be generated from the oil pressure generating device 110. Therefore, the ECU (not shown) detects this case, and supplies the liquid pressure stored in the compliance unit 160 to the wheel cylinder 40. Specifically, when it is inevitable to generate the braking pressure from the oil pressure generating device 110, the first and second switching valves 133 and 134 are closed, and the hydraulic piston 112 in the pressure chamber 111 is rapidly moved back to suck the oil from the reservoir 30 through the inlet passage 116, and then moved again forward to form the liquid pressure. For a period of time when the pressure chamber 111 sucks and compresses the oil, the liquid pressure from the compliance unit 160 is transmitted to the wheel cylinder 40, and thus a supply pressure may be prevented from being sharply reduced. Therefore, a problem in controlling an ABS mode and braking a vehicle due to a supply pressure drop in the ABS mode may be solved.

According to one embodiment of the present invention, the pedal simulator 150 is connected with the master cylinder 20 to provide the reaction force according to the pedal force of the brake pedal 10. According to the present invention, the passage which connects the master cylinder 20 with the pedal simulator 150 is connected with the first backup passage 141. The pedal simulator 150 includes the pedal simulation unit including the simulation chamber 151 which is provided to store the oil discharged from an outlet side of the master cylinder 20, a reaction force piston 152 which is provided in the simulation chamber 151 and a reaction force spring 153 which elastically supports the reaction force piston 152, and a simulation valve 155 which is connected with a rear end of the simulation chamber 151. At this time, the simulation chamber 151 is formed to be displaced within a predetermined range by the oil introduced into the simulation chamber 151.

The simulation valve 155 is connected with a rear end of the simulation chamber 151 and the reservoir 30 through an oil passage 158. At this time, the oil passage 158 is connected with the inlet passage 116 connected with the reservoir 30. As illustrated in the drawings, an entrance of the simulation chamber 151 is connected with the master cylinder 20, and a rear end of the simulation chamber 151 is connected with the simulation valve 155, and one side of the simulation chamber 151 is connected with the oil pressure generating device 110, and the simulation valve 155 is connected through the oil passage 158 with the inlet passage 116 connected with the reservoir 30.

The simulation valve 155 is configured with the normally closed type solenoid valve which is usually maintained in a closed state. When the driver presses down the brake pedal 10, the simulation valve 155 is opened to transmit the braking oil to the reservoir 30 or the oil pressure generating device 110. The simulation valve 155 is provided so that a degree of opening and closing thereof is controlled according to an applied intensity of power. That is, the simulation valve 155 is provided to control the degree of opening and closing and to provide an appropriate pedal feeling. For example, when the pressure generated by the oil pressure generating device 110 is transmitted to the simulation chamber 151, the simulation valve 155 controls the degree of opening and closing according to a transmitted back pressure, and realizes the appropriate pedal feeling.

Also, since the pedal simulation unit is configured with one reaction force piston 152 and one reaction force spring 153, a structure thereof may be simplified. Also, the pedal simulation unit may be formed to receive the pressure corresponding to the pedal force of the pedal according to the pedal displacement, and may realize the pedal feeling by controlling the degree of opening and closing of the simulation valve 155, and thus may always provide the constant pedal feeling. That is, since the pedal simulation unit according to the embodiment of the present invention provides the pedal feeling by receiving the liquid pressure from the oil pressure generating device 110 and controlling the simulation valve 155, the reaction force spring 153 may be formed to perform only a function which returns the reaction force piston 152. That is, even when the pedal simulator is used for a long period of time, and performance of the reaction force spring 153 is degraded, it does not have an affect on the pedal feeling.

Meanwhile, a simulation check valve 157 is provided between the pedal simulation unit and the master cylinder 20, i.e., at a passage connected with the oil passage 158 between the simulation chamber 151 and the simulation valve 155. The simulation check valve 157 is formed so that the oil from the reservoir 30 flows to the simulation chamber 151. The simulation check valve 157 is formed so that the pressure at the rear end of the simulation chamber 151 according to the pedal force of the brake pedal 10 flows through only the simulation valve 155. That is, while the reaction force piston 152 compresses the reaction force spring 153, the oil in the simulation chamber 151 is transmitted to the reserver 30 through the simulation valve 155 and the oil passage 158, and when the pedal force is released, the simulation chamber is filled with the oil through the simulation check valve 157.

Also, a control valve 159 which controls a flow in the passage according to the opening and closing operation is provided at the liquid pressure passage 156. When an urgent braking operation is performed, the control valve 159 is closed so that the liquid pressure generated from the oil pressure generating device 110 is not transmitted to the simulation chamber 151, but is transmitted toward the wheel cylinder 40. For example, when the pressure generated from the oil pressure generating device 110 is sharply increased, as the brake pedal 10 is suddenly pressed down to perform the urgent braking operation, the control valve 159 is closed, and thus the liquid pressure generated from the oil pressure generating device 110 is not lost, but may be totally transmitted to the wheel cylinder 40. The control valve 159 is configured with the normally closed type solenoid valve which is operated to be closed in the normal state and opened when the opening signal is received from the ECU.

Hereinafter, an operation in which the pedal feeling is realized by the pedal simulator according to one embodiment of the present invention will be described.

First, when the brake pedal 10 is pressed down, a braking level required by the driver may be detected by the pedal displacement sensor 11 through information on a pressure of the brake pedal 10 pressed by the driver. That is, the displacement of the brake pedal 10 is detected.

The ECU (not shown) receives the electric signal output from the pedal displacement sensor 11 and drives the motor 114. That is, the motor 114 is controlled according to the pedal displacement, and thus the pressure corresponding to the pedal force of the pedal is generated. At this time, the pressure generated from the oil pressure generating device 110 is the pressure transmitted to the simulation chamber 151 of the pedal simulation unit in addition to the pressure transmitted toward the cylinder 40. An operation state in which the pressure transmitted toward the wheel cylinder 40 is generated to perform the braking operation will be described again later.

When the pressure generated from the oil pressure generating device 110 is transmitted to the simulation chamber 151 through the liquid pressure passage 156, the degree of opening and closing of the simulation valve 155 is controlled according to the transmitted back pressure, and thus the appropriate pedal feeling is provided. For example, at an early stage of the braking operation, the degree of opening and closing of the simulation valve 155 may be increased to provide a soft pedal feeling, and at a last stage of the braking operation, the degree of opening and closing of the simulation valve 155 may be reduced to provide a hard pedal feeling. Also, the degree of opening and closing of the simulation valve 155 may be selectively controlled to provide various pedal feelings required by the driver.

Meanwhile, the oil pressure discharged through the simulation valve 155 is transmitted to the reserver 30 or the oil pressure generating device 110 through the oil passage 158 and the inlet passage 116.

The pedal feelings required by the driver may be provided by controlling the motor 114 of the oil pressure generating device 110 and the degree of opening and closing of the simulation valve 155. Also, since the pedal simulation unit is configured with one reaction force piston 152 and one reaction force spring 153, a structure of the pedal simulator may be simplified. Also, since the pedal feeling is provided through the degree of opening and closing of the simulation valve 155, the constant pedal feel may be always provided, even when the pedal simulator is used for a long period of time. That is, the liquid pressure corresponding to the pedal force of the pedal according to the pedal displacement is transmitted into the simulation chamber 151, and thus even when the performance of the reaction force spring 153 is changed, it does not have an affect on the pedal feeling.

Meanwhile, the above-described electronic brake system is just an example for realizing the pedal feeling through the pedal simulator 150 according to one embodiment of the present invention, and the present invention is not limited thereto. The present invention may be applied to various kinds of electronic brake systems in which the displacement of the brake pedal is detected and the liquid pressure is generated through the oil pressure generating device 110.

An operation state of the electronic brake system with the pedal simulator will be briefly described.

First, when the system is normally operated, and the braking operation is started by the driver, the braking level required by the driver may be detected by the pedal displacement sensor 11 through the information on the pressure of the brake pedal 10 pressed by the driver. The ECU (not shown) receives the electric signal output from the pedal displacement sensor 11 and drives the motor 114. Also, the ECU may receive a regenerative braking level through the second pressure sensor S2 provided at the outlet side of the master cylinder 20 and the first pressure sensor S1 provided at the outlet side of the oil pressure generating device 110, and a friction braking level may be calculated according to a difference between the braking level required by the driver and the regenerative braking level, and thus an amplitude of the increased or reduced pressure at the wheel side may be grasped.

Specifically, at the early state of the braking operation, when the driver presses down the brake pedal 10, the motor 114 is operated, and the rotating force of the motor 114 is converted into the rectilinear motion, and then presses the pressure chamber 111. At this time, the pressure chamber 111 is connected with the reserver 30 through the inlet passage 116, and thus the oil is stored therein, and the liquid pressure is generated according to the rectilinear motion of the ball screw member 115. Also, the first and second blocking valves 143 and 144 installed at the first and second backup passage 141 and 142 connected with an outlet port of the master cylinder 20 are closed, and thus the oil pressure generated from the master cylinder 20 is not transmitted to the wheel cylinder 40. Therefore, the liquid pressure generated from the pressure chamber 111 is transmitted to each wheel cylinder 40 through the first and second inlet passage 131 and 132. That is, since the first and second switching valves 133 and 134 are opened by the ECU to control the liquid pressure supplied to the first and second circuits 121 and 122, the liquid pressure is transmitted, and thus the braking force is generated.

Also, as described above, the liquid pressure according to the pedal displacement is generated from the oil pressure generating device 110, and then transmitted to the simulation chamber 151, and thus the degree of opening and closing of the simulation valve 155 is controlled, and the appropriate pedal feeling is provided to the driver.

Meanwhile, when the ABS cycle is continued for a long period of time, and thus it is inevitable to generate the braking pressure from the oil pressure generating device 110, the first and second switching valves 133 and 134 are closed, and the hydraulic piston 112 in the pressure chamber 111 is rapidly moved back to suck the oil from the reserver 30 through the inlet passage 116, and then moved again forward to form the liquid pressure. For a period of time when the pressure chamber 111 sucks and compresses the oil, the liquid pressure from the compliance unit 160 is transmitted to the wheel cylinder 40, and thus the supply pressure may be prevented from being sharply reduced.

Next, a case in which the electronic brake system is not normally operated will be described. When the driver presses down the brake pedal 10, the input rod 12 connected with the brake pedal 10 is moved forward toward a left side, and at the same time, the first piston 21a which is in contact with the input rod 12 is also moved forward toward the left side. At this time, since there is not a gap between the input rod 12 and the first piston 21a, the braking operation may be rapidly performed. That is, the liquid pressure generated by the pressed master cylinder 20 is transmitted to the wheel cylinder 40 through the first and second backup passages 141 and 142 for a backup braking operation, and thus the braking force is realized. At this time, since the first and second blocking valves 143 and 144 installed at the first and second backup passages 141 and 142 are configured with the normally open type solenoid valves, and the simulation valve 155 and the first and second switching valves 133 and 134 are configured with the normally closed type solenoid valves, the liquid pressure is directly transmitted to the wheel cylinder 40. Therefore, the braking operation may be stably performed, and stability of the braking operation may be enhanced.

Since the electronic brake system is configured so that the driver's braking intention according to the pedal force of the brake pedal 10 is detected, and the electric signal is output so as to control the motor 114, and the rotational motion of the motor 114 is converted into the rectilinear motion to generate the liquid pressure, the liquid pressure may be precisely controlled. Also, when the brake system breaks down, the braking oil pressure generated by the driver's pedal force is directly supplied to the wheel cylinder 40 through the backup passages 141 and 142, and thus the stability of the braking operation may be enhanced.

Therefore, since the pedal simulator 150 provided at the electronic brake system controls the motor 114 and the opening and closing level of the simulation valve 155 according to the pedal displacement using the simulation valve 155 and the oil pressure generating device 110 connected with the pedal simulation unit, the appropriate pedal feeling may be provided, and also the pedal feeling may be constantly provided. Further, the various pedal feelings may be selectively provided by controlling the degree of opening and closing of the simulation valve 155, and the structure of the pedal simulator 150 may be simplified.

Figure 4:
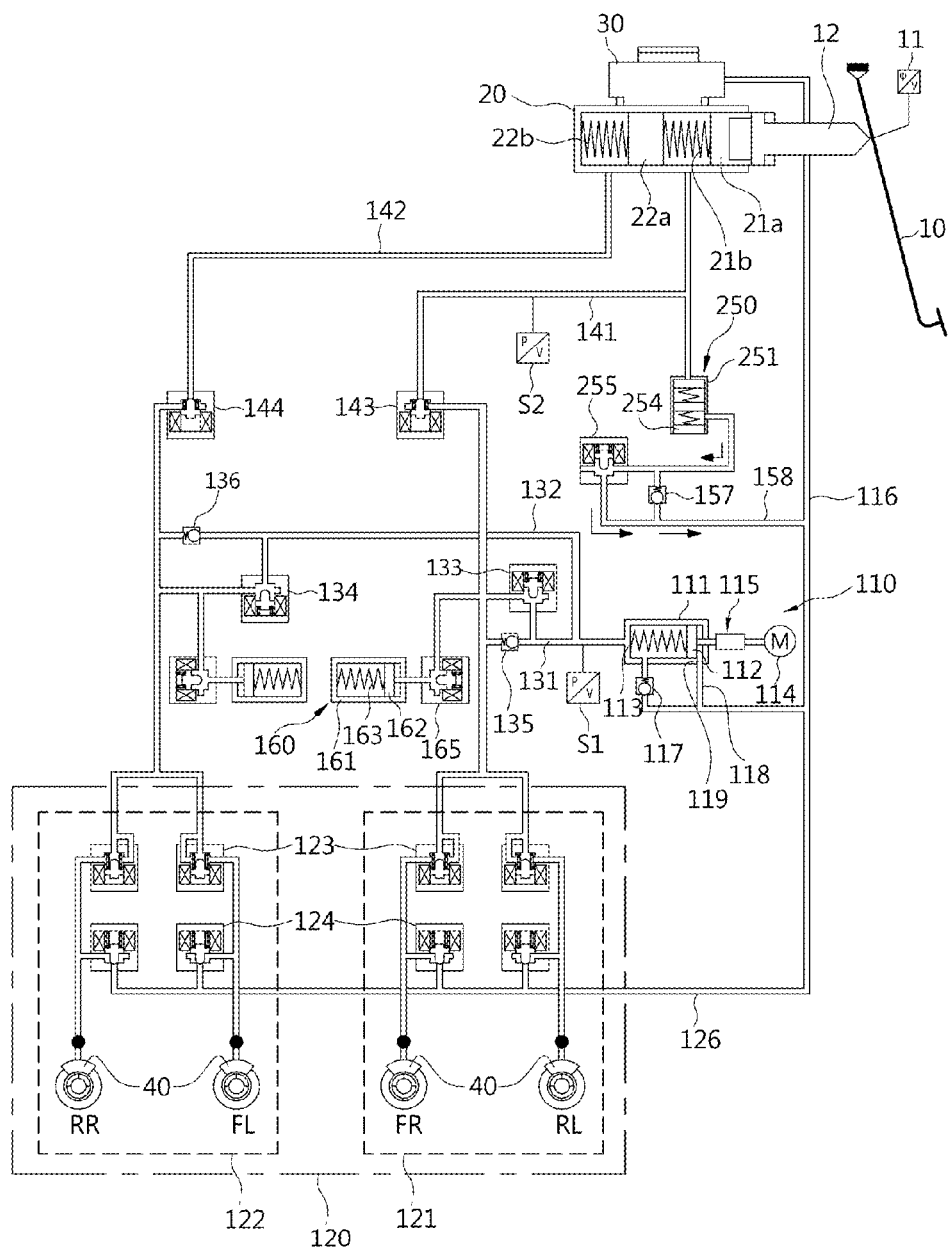
FIG. 4 is a hydraulic circuit diagram schematically illustrating an electronic brake system with the pedal simulator according to another embodiment of the present invention.

It has been described that the pedal simulator 150 receives the liquid pressure from the oil pressure generating device 110, controls the degree of opening and closing of the simulation valve 155, and provides the pedal feeling. However, the pedal simulator 150 is not limited thereto, and may be provided not to receive the liquid pressure from the oil pressure generating device 110 and to provide the pedal feeling through the degree of opening and closing of the simulation valve 155. The pedal simulator 150 in which the pedal feeling is provided by controlling only the degree of opening and closing of the simulation valve 155 is illustrated in FIGS. 4 and 5. Here, the same reference numerals as those in the previous drawings indicate the members having the same functions.

Figure 3:
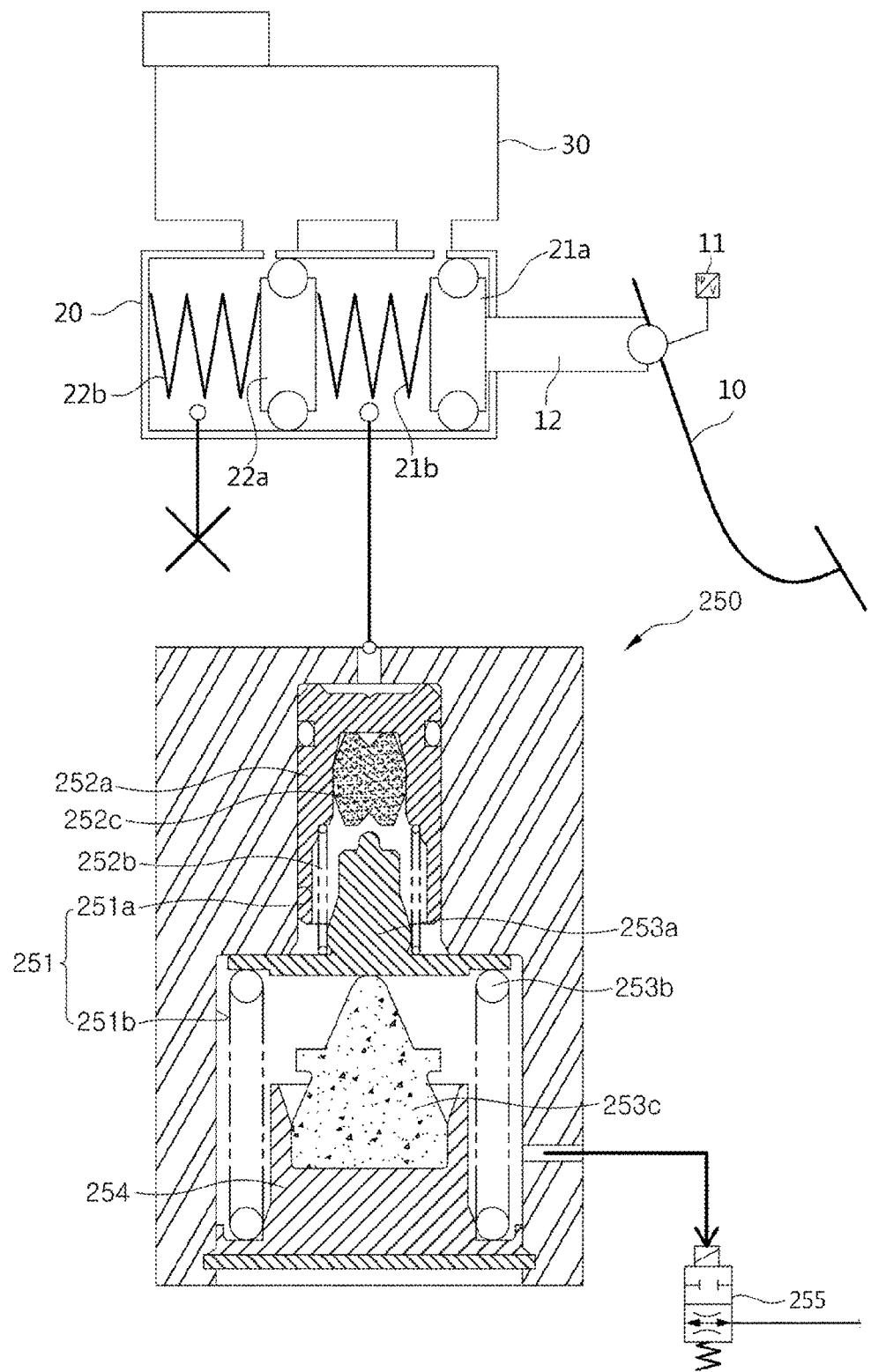
FIG. 3 is a view schematically illustrating a connection structure of a pedal simulator according to another embodiment of the present invention.

FIG. 3 is a view schematically illustrating a connection structure of a pedal simulator according to another embodiment of the present invention, and FIG. 4 is a hydraulic circuit diagram schematically illustrating an electronic brake system with the pedal simulator according to another embodiment of the present invention.

Referring to FIGS. 3 and 4, the pedal simulator 250 is configured so that the pedal feeling is controlled by a degree of opening and closing of a simulation valve 255 connected with the pedal simulation unit. At this time, the pedal simulator 250 according to the embodiment of the present invention is provided to have a structure in which a simulation chamber 251 is not connected with the oil pressure generating device 110. More specifically, the pedal simulator 250 includes a pedal simulation unit including the simulation chamber 251 which is provided to store the oil discharged from the outlet side of the master cylinder 20, first and second reaction force parts which are provided in series in the simulation chamber 251 to provide the pedal feeling, and a damping housing 254 which is installed to close a lower end of the simulation chamber 251, and the simulation valve 255 which is connected with the simulation chamber 251.

At this time, the simulation valve 255 is connected with one side portion of the simulation chamber 251 and the inlet passage 116 connected with the reserver 30 through the oil passage 158.

The simulation chamber 251 has a stepped shape having a first bore 251a in which the first reaction force part is disposed and a second bore 251b in which the second reaction force part is disposed. According to the drawings, the first bore 251a is formed to have a smaller diameter than the second bore 251b.

The first reaction force part includes a first reaction force piston 252a which is slidably installed in the first bore 251a, a first damping member 252c which is installed to be moved along with the first reaction force piston 252a, and a first reaction force spring 252b which is compressed by the first reaction force piston 252a.

The first reaction force piston 252a is moved downward, when an oil pressure is introduced from a passage connected with the master cylinder 20. At this time, the first reaction force piston 252a is provided so that a lower side thereof is opened, and thus the first damping member 252c is inserted into the first reaction force piston 252a. Therefore, when the first reaction force piston 252a is moved, the first damping member 252c is moved together, and the first reaction force spring 252b provides a reaction force, when the first reaction force piston 252a is moved.

The first reaction force spring 252b has a coil shape of which an upper end is supported by the first reaction force piston 252a, and a lower end is supported by the second reaction force piston 253a which will be described later. The first reaction force spring 252b is pressed by the first reaction force piston 252a, and provides the reaction force to the brake pedal 10.

The first damping member 252c is formed of a rubber material so as to be elastically deformed, and serves to provide the reaction force to the brake pedal 10, as the first damping member 252c is in contact with the second reaction force piston 253a which will be described later and then pressed.

The second reaction force part is provided at the second bore 251b, and includes the second reaction force piston 253a, a second reaction force spring 253b which is installed between the second reaction force piston 253a and the damping housing 254 to be compressed by the second reaction force piston 253a, and a second damping member 253c which is installed at the damping housing 254 to be supported.

At this time, the damping housing 254 is installed at the simulation chamber 251, i.e., a lower end of the second bore 251*b* to be spaced a predetermined distance from the second reaction force piston 253*a*. The damping housing 254 serves to close the lower end of the simulation chamber 251, and also to support the second damping member 253*c*.

The second reaction force piston 253*a* is provided to be spaced a predetermined distance from the first reaction force piston 252*a*, and to support a lower end of the first reaction force spring 252*b*. Also, the second reaction force piston 253*a* is formed to partly protrude toward the first damping member 252*c* and thus to press the first damping member 252*c*.

The second reaction force spring 253*b* has the coil shape to provide the reaction force to the brake pedal 10. That is, when second reaction force piston 253*a* is moved, the second reaction force spring 253*b* is compressed so as to provide the reaction force. At this time, the second reaction force spring 253*b* is formed to have a greater elastic coefficient than the first reaction force spring 252*b*. Therefore, the first reaction force piston 252*a* is pushed, and then the second reaction force piston 253*a* is pushed.

The second damping member 253*c* is formed of the rubber material so as to be elastically deformed, and serves to provide the reaction force to the brake pedal 10, as the first damping member 252*c* is in contact with the second reaction force piston 253*a* and then pressed. As described above, the second damping member 253*c* is installed at the damping housing 254.

The pedal simulation unit as described above is connected with the simulation valve 255 to provide the pedal feeling according to the degree of opening and closing of the simulation valve 255. The simulation valve 255 is configured with the normally closed type solenoid valve which is usually maintained in the closed state. When the driver presses down the brake pedal 10, the simulation valve 255 is opened to transmit the oil in the simulation chamber 251 to the reserver 30 or the oil pressure generating device 110. The simulation valve 255 is formed so that the degree of opening and closing is controlled by the intensity of the applied power. That is, the simulation valve 255 is formed to control the opening and closing degree and thus to provide the appropriate pedal feeling.

Meanwhile, since the pedal simulation unit is formed to have the plurality of reaction force springs 252*b* and 253*b* and the plurality of damping members 252*c* and 253*c* and thus to provide the reaction force, it is possible to effectively provide the pedal feeling similar to that provided in a conventional brake system (CBS).

The pedal simulator according to one embodiment of the present invention can provide the pedal feeling by generating the pressure similar to that of the pedal force of the pedal at the pedal simulation unit, and can provide the appropriate pedal feeling by controlling an oil pressure level generated by transmitting the oil pressure to the inside of the pedal simulation unit and the degree of opening and closing of a simulation valve.

Also, even though the pedal simulation unit is configured with one piston and one spring, it is possible to provide the appropriate pedal feeling and thus to have the simple structure. Therefore, a manufacturing cost can be reduced.

In addition, since the pressure is controlled through the simulation valve, the constant pedal feeling can be always provided.

Meanwhile, since the simulation valve is controlled to be interlocked with a rotational speed and a rotational angle of the motor, the pressure can be precisely controlled. Also the degree of opening and closing of the simulation valve is selectively controlled, and thus the various pedal feelings can be provided.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A pedal simulator installed at an electronic brake system which comprises a master cylinder coupled with a reserver and configured to generate an oil pressure according to a driver's pedal force, a pedal displacement sensor configured to detect displacement of a brake pedal, and an oil pressure generating device configured to output an electric signal corresponding to an operation of the brake pedal through the pedal displacement sensor, to operate a motor and to convert a rotating force of the motor into a rectilinear motion, the pedal simulator comprising:
 a pedal simulation unit connected with the master cylinder and configured to provide a reaction force according to the pedal force of the brake pedal; and
 a simulation valve connected with a rear end of the pedal simulation unit and configured to control a flow in a passage according to an opening and closing operation,
 wherein the simulation valve controls a flow rate of the oil by controlling a degree of opening and closing according to a back pressure transmitted to the pedal simulation unit through the oil pressure generating device.

2. The pedal simulator according to claim 1, wherein the oil pressure generating device receives displacement of the brake pedal through the pedal displacement sensor, and supplies a pressure corresponding to the displacement to the pedal simulation unit.

3. The pedal simulator according to claim 1, wherein the pedal simulation unit comprises a simulation chamber configured to store oil discharged from an outlet side of the master cylinder; a reaction force piston slidably provided in the simulation chamber; and a reaction force spring provided in the simulation chamber to provide an elastic force to the reaction force piston.

4. The pedal simulator according to claim 1, wherein the simulation valve is a normally closed type solenoid valve which is operated to be closed in a normal state and opened when an opening signal is received.

5. The pedal simulator according to claim 1, wherein the oil pressure generating device is connected with the reserver through an inlet passage to receive oil, and an outlet side of the oil pressure generating device is connected with the pedal simulation unit, and the simulation valve connected with the pedal simulation unit is connected with the reserver through the inlet passage.

6. The pedal simulator according to claim 1, wherein the oil pressure generating device is connected with the pedal simulation unit through a liquid pressure passage, and the liquid pressure passage is formed to be branched from a passage connected with an outlet side of the oil pressure generating device.

7. A pedal simulator installed at an electronic brake system which comprises a master cylinder coupled with a reserver and configured to generate an oil pressure according to a driver's pedal force, a pedal displacement sensor configured to detect displacement of a brake pedal, and an oil pressure generating device configured to output an electric signal corresponding to an operation of the brake pedal through the pedal displacement sensor, to operate a motor and to convert a rotating force of the motor into a rectilinear motion, the pedal simulator comprising:
a pedal simulation unit connected with the master cylinder and configured to provide a reaction force according to the pedal force of the brake pedal; and
a simulation valve connected with a rear end of the pedal simulation unit and configured to control a flow in a passage according to an opening and closing operation,
wherein the simulation valve controls a flow rate of the oil by controlling a degree of opening and closing, and
wherein the oil pressure generating device is connected with the reserver through an inlet passage to receive oil, and an outlet side of the oil pressure generating device is connected with the pedal simulation unit, and the simulation valve connected with the pedal simulation unit is connected with the reserver through the inlet passage.

8. The pedal simulator according to claim 7, wherein the oil pressure generating device receives displacement of the brake pedal through the pedal displacement sensor, and supplies a pressure corresponding to the displacement to the pedal simulation unit.

9. The pedal simulator according to claim 8, wherein the simulation valve controls the degree of opening and closing according to a back pressure transmitted to the pedal simulation unit through the oil pressure generating device.

10. The pedal simulator according to claim 7, wherein the pedal simulation unit comprises a simulation chamber configured to store oil discharged from an outlet side of the master cylinder; a reaction force piston slidably provided in the simulation chamber; and a reaction force spring provided in the simulation chamber to provide an elastic force to the reaction force piston.

11. The pedal simulator according to claim 7, wherein the simulation valve is a normally closed type solenoid valve which is operated to be closed in a normal state and opened when an opening signal is received.

12. The pedal simulator according to claim 8, wherein the oil pressure generating device is connected with the pedal simulation unit through a liquid pressure passage, and the liquid pressure passage is formed to be branched from a passage connected with an outlet side of the oil pressure generating device.

13. A pedal simulator installed at an electronic brake system which comprises a master cylinder coupled with a reserver and configured to generate an oil pressure according to a driver's pedal force, a pedal displacement sensor configured to detect displacement of a brake pedal, and an oil pressure generating device configured to output an electric signal corresponding to an operation of the brake pedal through the pedal displacement sensor, to operate a motor and to convert a rotating force of the motor into a rectilinear motion, the pedal simulator comprising:
a pedal simulation unit connected with the master cylinder and configured to provide a reaction force according to the pedal force of the brake pedal; and
a simulation valve connected with a rear end of the pedal simulation unit and configured to control a flow in a passage according to an opening and closing operation,
wherein the simulation valve controls a flow rate of the oil by controlling a degree of opening and closing, and
wherein the oil pressure generating device is connected with the pedal simulation unit through a liquid pressure passage, and the liquid pressure passage is formed to be branched from a passage connected with an outlet side of the oil pressure generating device.

14. The pedal simulator according to claim 13, further comprising a control valve provided at the liquid pressure passage to control the flow in the passage according to an opening and closing operation.

15. The pedal simulator according to claim 14, wherein the control valve is provided in a normally closed type solenoid valve which is operated to be closed in a normal state and opened when an opening signal is received.

16. The pedal simulator according to claim 13, wherein the oil pressure generating device receives displacement of the brake pedal through the pedal displacement sensor, and supplies a pressure corresponding to the displacement to the pedal simulation unit.

17. The pedal simulator according to claim 16, wherein the simulation valve controls the degree of opening and closing according to a back pressure transmitted to the pedal simulation unit through the oil pressure generating device.

18. The pedal simulator according to claim 13, wherein the oil pressure generating device is connected with the reserver through an inlet passage to receive oil, and an outlet side of the oil pressure generating device is connected with the pedal simulation unit, and the simulation valve connected with the pedal simulation unit is connected with the reserver through the inlet passage.

19. The pedal simulator according to claim 13, wherein the pedal simulation unit comprises a simulation chamber configured to store oil discharged from an outlet side of the master cylinder; a reaction force piston slidably provided in the simulation chamber; and a reaction force spring provided in the simulation chamber to provide an elastic force to the reaction force piston.

20. The pedal simulator according to claim 13, wherein the simulation valve is a normally closed type solenoid valve which is operated to be closed in a normal state and opened when an opening signal is received.

* * * * *